United States Patent [19]
Schmitt

[11] Patent Number: 4,505,328
[45] Date of Patent: Mar. 19, 1985

[54] SYSTEM FOR CONDITIONING AIR

[76] Inventor: Robert F. Schmitt, 399 Grossbrook Dr., Berea, Ohio 44017

[21] Appl. No.: 969,074

[22] Filed: Dec. 13, 1978

[51] Int. Cl.³ .......................................... F24D 15/00
[52] U.S. Cl. .................................... 165/53; 237/2 B;
62/263; 62/453; 62/276; 165/63; 165/48 R;
417/372
[58] Field of Search ................. 62/263, 453, 510, 276,
62/507; 237/2 B; 165/53, 54, 56, 57, 122, 62,
29, 63, 48; 417/372

[56] References Cited
U.S. PATENT DOCUMENTS

| 1,975,859 | 10/1934 | Nelson | 165/57 |
|---|---|---|---|
| 2,100,834 | 11/1937 | Chapman | 62/507 |
| 2,107,644 | 2/1938 | Ohmart | 417/372 |
| 2,362,729 | 11/1944 | Smith | 62/263 |
| 2,723,083 | 11/1955 | Bary | 237/2 B |
| 3,045,448 | 7/1962 | Lauer | 62/263 |
| 3,308,634 | 3/1967 | Smith | 62/263 |
| 4,013,120 | 3/1977 | Rheinheimer | 62/263 |

FOREIGN PATENT DOCUMENTS

| 973376 | 8/1975 | Canada | 62/260 |
|---|---|---|---|
| 2219208 | 12/1977 | Fed. Rep. of Germany | 237/2 B |

Primary Examiner—Margaret A. Focarino
Attorney, Agent, or Firm—Maky, Renner, Otto & Boisselle

[57] ABSTRACT

A system for conditioning the air of a selected area, e.g. a room, of a house or other building structure, including individual refrigeration units for respectively heating and cooling the room. The respective units are sized according to the heating and cooling loads of the room, and when heating add blower motor and compressor heat and when cooling exclude such extraneous heat.

9 Claims, 4 Drawing Figures

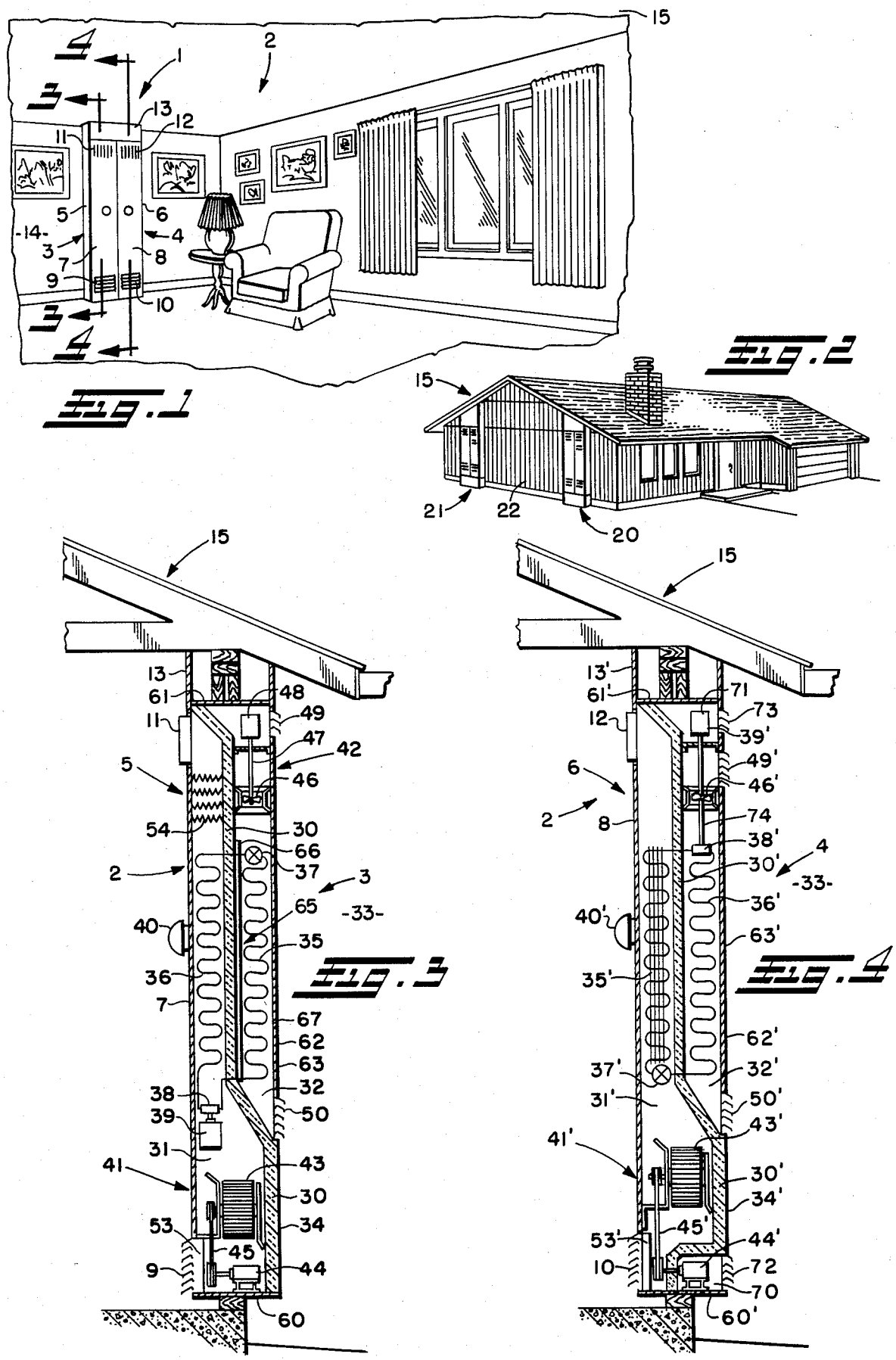

SYSTEM FOR CONDITIONING AIR

BACKGROUND OF THE INVENTION

The present invention relates to systems for conditioning, i.e. heating and/or cooling, the air of a selected area, e.g. a room in a house or other building structure, and, more particularly, to such a system that employs separate refrigeration units respectively for heating and cooling.

Prior systems for conditioning the air of a building, such as a house, have included a number of inefficiencies, and with the present effort to conserve energy it is desirable to minimize and/or eliminate such inefficiencies. For example, in connection with combination whole-house heating and air conditioning systems a common blower and air duct system is used to convey heated or cooled air throughout the house. Heat generated by the blower motor, which usually is exposed to the air flow, reduces system efficiency during the cooling operation, and substantial losses usually occur through duct walls before the heated or cooled air even reaches intended discharge vents. Heat also may be lost where ducts pass through slab floors. Moreover, zone control is difficult and inefficient because it is usually obtained by damper adjustment, which unbalances the system and reduces blower optimization.

In view of the depletion and increased cost of energy resources, the recent trend, particularly in home heating and cooling, has been toward the use of electric heat pumps, which typically have a heating seasonal coefficient of performance (C.O.P.) of 1.5 to 1.8 in 6000 to 7000 heating degree day areas. Comparatively electric resistance heating systems have a less efficient C.O.P. of 1. A heat pump for providing adequate heating with the indicated higher C.O.P. efficiency typically includes a refrigerant system with condensation coils, evaporation coils and a reversing valve, which enables reverse system operation to obtain room air heating or cooling, as desired. To achieve the 1.5 to 1.8 C.O.P. the refrigerant system of the heat pump is sized for the cooling load in the house, and such system is reversed for heating so that the evaporator coil becomes the condensor coil thereby giving off heat to the air handler exchange coils. Where the cooling load is substantially less than the heating load, as is the usual case in cool climate areas, the compressor sizing is inadequate to handle the total heat load. To overcome such inadequacy resistance heat is ordinarily added in series with the condenser coil when necessary, which lowers the heating C.O.P. of the system. Moreover, the reversing or switch over valve in the refrigerant system also reduces system efficiency by about 5%. Similarly, in high cooling and low heating climates, conventional heat pumps are not wholly efficient because of the heating and cooling capacity unbalance.

SUMMARY OF THE INVENTION

A system for conditioning the air of a selected area, e.g. a room, of a house or other building structure, includes separate, individual refrigeration units for respectively heating and cooling the room. The invention will be described in detail below in connection with a system used to heat and cool a single room of a house; however, it will be appreciated that the invention may be employed in connection with heating and/or cooling of other specified areas of buildings.

In accordance with the invention the individual refrigeration units for respectively heating and cooling a room are sized according to the heating and cooling loads, respectively, for the room, are individually designed with optimum motor placement for recapture or exclusion, as desired, of blower motor and compressor motor heat, eliminate duct work, and have individual conventional thermostatic controls for efficient zone control. Moreover, since each unit is a relatively small unit, relatively small rotary compressors, which have a longer life and better efficiency than piston compressors, and fractional horsepower motors, which are less costly per horsepower than larger motors, may be used. The individual units may be easily serviced and preferably are conveniently architecturally adaptable. Also, since several such heating and/or cooling units would be employed, according to the invention, to heat and/or cool a house, the possibility of encountering an emergency situation due to a break down of a single unit is substantially reduced.

With the foregoing in mind, it is a primary object of the present invention to provide a system for conditioning the air of a selected area of a building that is improved in the noted respects.

Another primary object is to improve the overall efficiency with which the heating and/or cooling of air for a selected area of a building is accomplished.

The above and further objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a fragmentary perspective view of a preferred embodiment of air heating and cooling system of the invention installed in a room of a house;

FIG. 2 is a perspective view of a house in which at least two such systems are employed for heating and cooling purposes;

FIG. 3 is a side elevation view partly in section looking generally in the direction of the arrows 3—3 of FIG. 1 of a refrigeration unit in accordance with the present invention used for heating a room; and FIG. 4 is a side elevation view partly in section looking generally in the direction of the arrows 4—4 of FIG. 1 of another refrigeration unit in accordance with the present invention used for cooling the same.

DESCRIPTION OF THE PREFERRED EMBODIMENT

Referring now in detail to the drawing, a system for conditioning air in accordance with the present invention is generally indicated at 1 in FIG. 1. The system 1 is shown associated with a room 2 of a house or other building structure and includes a pair of refrigeration units 3, 4 for respectively heating and cooling the air in such room. As shown, the units 3, 4 are desirably mounted in individual but associated cabinet housings 5, 6, which are preferably disposed in side by side relationship as shown, with the respective doors 7, 8 providing convenient access to such units from within the room, and inlet vents 9, 10 and outlet vents 11, 12 in the face of each cabinet from which air is drawn from the room for conditioning, i.e. heating or cooling, and then discharged into the room.

Preferably the cabinets 5, 6 are of a standard configuration and size with each having a suitable volume to accommodate refrigeration units of a wide range of capacities. The cabinets, then, may be mass produced and conveniently mounted in a frame 13 which is built into an exteriorly facing wall 14 of the building or house 15. Each of the refrigeration units 3, 4 and cabinets 5, 6 containing the same is preferably of vertically elongate configuration which provides an efficient air flow path therethrough, and outside the house presents a columnar appearance which is conveniently architecturally adaptable to esthetically pleasing house appearance. A typical example of such columnar construction is illustrated in FIG. 2 wherein several systems 20, 21 in accordance with the present invention are provided in an external wall 22 of the house 15 for heating and cooling the air of two individual rooms thereof.

To illustrate specifically the efficiency obtained by the system of the present invention, a typical living room of a house was analyzed according to Manual J. The maximum heat requirement was determined to be 8,350 BTU's per hour and the maximum cooling load 4,358 BTU's per hour. To meet these requirements, the refrigeration unit 3 to be used for heating was required to have a two-thirds ton capacity and the refrigeration unit 4 to be used for cooling was required to be a one-third ton capacity, based on one ton being equal to 12,000 BTU's per hour of motor and compressor capacity. On the other hand, if a single prior art heat pump having air or refrigerant switch-over capability to heat and cool the living room was used for both heating and cooling, the compressor sizing would be selected according to the cooling load, and any heat requirement beyond the 4,358 BTU's per hour capacity of the heat pump would have to be made up with electric resistance heat which has a lower efficiency C.O.P. of 1 and would, accordingly, reduce the overall system efficiency. With the system of the present invention, resistance heat ordinarily would be unnecessary, and both the heating and cooling units 3, 4 would be generally operated in a relatively highly efficient manner with a relatively large C.O.P.

Turning now to FIG. 3, the unit 3 for heating the room 2 is illustrated in greater detail. The unit 3 is divided by a wall of thermal insulation 30 into an inner chamber 31, which effectively faces the interior of room 2, and an exterior chamber 32, which is in effect thermally isolated from the room 2 and in direct exposure to the outside environment 33 exteriorly of the house 15. The wall of insulation 30 may be of conventional type and preferably includes a satisfactorily weatherproof exterior facing 34 where it is in direct exposure to the outside environment 33. The unit 3 includes the conventional evaporation coils 35, condensation coils 36, expansion valve 37, compressor 38, which is powered by an electric motor 39, and a conventional refrigerant or working fluid, such as Freon, not shown. The unit 3, including elements 35-39, operate in conventional manner in response to a conventional thermostatic control mechanism and circuit schematically indicated at 40. However, such unit 3 is non-reversible so that the condensation coils 36 are capable only of heating air blown thereacross by a blower 41 while air from the outside environment 33 is blown across the evaporation coils 35 by a fan 42. The blower 41 includes a conventional low speed drum blower 43 driven by a conventional electric blower motor 44 coupled thereto by a belt 45. Preferably the blower motor 44 and the compressor motor 39 are of fractional horsepower size and the compressor 38 is of the rotary type thereby to achieve the aforementioned advantages of the individual heat pump configuration of the present invention. The fan 42 includes a fan blade 46 which is mounted on a shaft 47 for rotation by a small electric motor 48 whenever the heat pump 3 is energized by the control 40. The rotating fan 42 draws outside air through a louver 49 at the top of the cabinet 5 into an upper portion of the exterior chamber 32 and blows such air downwardly across the evaporation coils 35 for discharge to the outside environment 33 through louvers 50.

During operation of the unit 3, the control 40 effects energization of the motors 39, 44, 48. Accordingly, outside air is blown across the evaporation coils 35 while air from the room 2 is drawn into the inner chamber 31 through louvers 9 by the blower 41. Such inside air is blown along a flow path across the condensation coils 36, where heating occurs, for discharge into the room 2 through louvers 11. Both the compressor motor 39 and the blower motor 44 are mounted in the inner chamber 31 in direct exposure to air flowing along the flow path therethrough; such exposure enables recapture of heat generated by such motors during operation of the unit 3. An air filter 53 may be mounted behind the louvers 9 to filter dust particles from the air drawn into the inner chamber 31, and electric resistance heaters 54 may optionally be employed, as shown, in the inner chamber 31 for further heating of the air in the event there is an excessive heating load called for by the control 40. However, in contrast to the usual heat pump in which during the heating mode the auxiliary electric resistance heater comes on automatically any time there is a temperature differential drop of, for example, 1½° F. of the room temperature below the thermostat setting, the electric resistance heater 54 in the unit 3 of the present invention must be manually turned on. This normally results in improved efficiency in that it requires a conscious decision by the occupant before any of the higher priced energy required to operate the electric resistance heaters is used.

The cabinet 5 is preferably a substantially self-contained unit including a front wall with the door 7 therein, a bottom 60, a top 61, and an outside wall 62 which includes the facing 34 and, if desired, a door 63 for convenient access to the components of the units on the exterior side of insulation wall 30. For convenience of installation the cabinets 5 for various units in accordance with the invention preferably are of a standard size with the principal differences among units in accordance with the invention being the capacity thereof and the direction of operation, i.e. for heating or cooling purposes. Since each unit, including the cabinet thereof, provides an integral flow path for air received directly from the room 2 and discharged directly into such room, no duct work is required whatever. Preferably the unit 3 is completely manufactured at the factory so there is no need to hook up fluid lines during installation in a house; therefore, the working fluid or refrigerant system may be factory hermetically sealed for improved life expectancy and particularly warranty life. The foregoing are believed to enable operation of the unit 3 at a C.O.P. of 2 while satisfactorily heating the room 2 when the outside temperature is about 0° F.; a conventional heat pump operating under the same circumstances would have a C.O.P. of approximately 1.1.

In the past, frost or ice has sometimes accumulated on the evaporator coils of a conventional heat pump. Such accumulation impedes efficient thermal energy transfer with respect to air blown across the evaporation coils by the fan. In accordance with the present invention the unit 3 may be provided with a supplemental heater 65 which is energized when necessary to remove ice from the evaporation coils 35. The supplemental heater 65 preferably includes a radiant defrost panel 66, energized under control of the thermostatic control 40 and, if desired, an ice sensor, for example, not shown, appropriately placed relative to the evaporation coils 35. The panel 66 is shown mounted on the insulation wall 30 to direct radiant heat toward the evaporation coils 35, and, if desired, a heat reflector 67 facing both the coils 35 and the panel 66 concentrates heat produced by the latter onto the evaporation coils. Alternatively, the reflector 67 also may be a radiant panel selectively energizeable to direct heat onto the coils 35. Preferably at least a substantial amount of the heat developed by the supplemental heater 65 in excess of that required to melt ice on the evaporation coils 35 will be recaptured as useful heat by absorption by the evaporation coils and transmission, then, into the fluid therein.

The refrigeration unit 4 for cooling the room 2 is shown in FIG. 4 and is substantially similar in components, construction, and operation to the unit 3 described above with reference to FIG. 3, whereby corresponding components are designated with primed reference numerals in FIG. 4. However, the elements 35'–38' of the unit 4 are effectively reversed from the corresponding elements of the unit 3 so that air blown along the flow path 31' by the blower 41' will be cooled by the evaporation coils 35' prior to discharge of the air through the louver or vent 12 into the room 2. Also for optimum efficiency of the unit 4, the blower motor 44' is positioned in a compartment 70, which is isolated from the inner chamber 31' by the wall of thermal insulation 30', and the compressor motor 39' also is positioned in a compartment 71, which is isolated from the inner chamber 31' by the wall 30'. Heat from the blower motor 44' and compressor motor 39', then, is excluded from the inner chamber 31'. Additional louvers 72, 73 on the outside wall 62' provide a path for air into the chambers 70, 71 to cool the motors. Moreover, for space, energy, and cost efficiency, the blade 46' of the fan 42' may be mounted on the output shaft 74 of the compressor motor 39' so that such motor both drives the compressor 38' and the fan blade 46'.

It will be appreciated that in climates where the building area heating requirement exceeds that of the cooling requirement, the capacity of the unit 3 will be larger than that of the unit 4, and vice versa. Accordingly, the units 3, 4 may be appropriately sized for the climate, volume and insulation characteristics of the area to be heated or cooled thereby, and so on, thereby obtaining both a size and use efficiency not heretofore realized in combination heat pump systems for heating and cooling purposes.

Moreover, the system is readily adaptable to "demand electric rates", in that during demand high rate periods of the day, some of the units can be turned off or left off and only operate the units associated with those areas principally occupied so as to keep the power consumption below that at which the higher rates apply. An electrical interlock system could be employed so that heating or cooling electricity demand can be prioritized and programmed.

Also, while such units 3, 4 are normally provided in such association for respectively heating and cooling a particular area, it will be appreciated that in climates where only heating or cooling is required, one of such units 3 or 4 would be eliminated. Similarly, such a system enables one to avoid heating and cooling unusual rooms thereby affording an efficiency factor not possible with conventional systems. For example, a kitchen in the winter has very little heating need because of food refrigerator heat, cooking heat, dishwasher heat and occupant heat. In the summer, on the other hand, the cooling need for a kitchen is extraordinary for the same reasons. With the system of the present invention, a very small resistance heater on a separate thermostat could be used for heating the kitchen in the winter months, and a separate cooling unit of appropriate size could be installed for cooling the kitchen during the summer. This same principle has lesser but important application to other rooms of a house as well, including the basement, utility room, baths, etc.

Although the invention has been shown and described with respect to a certain preferred embodiment, it is obvious that equivalent alterations and modifications will occur to others skilled in the art upon the reading and understanding of the specification. This present invention includes all such equivalent alterations and modifications and is limited only by the scope of the claims.

The embodiments of the invention in which an exclusive property or privilege is claimed are defined as follows:

1. A system for heating the air of an area of a building, comprising a refrigeration heating unit, including an evaporation coil, a condensation coil, an expansion valve, a compressor, and a working fluid, thermal insulation means for separating at least a substantial portion of said evaporation coil from said condensation coil, the former and latter being positioned in air flow communication, respectively, with air exteriorly and with air inside of such building as separated by said thermal insulation means, blower means for blowing air from within such area along a flow path across said condensation coil to be heated thereby and into such area for heating the same, and motor means for driving said blower means, said motor means being positioned on a side of said thermal insulation means in exposure to air from within such area whereby heat developed by said motor means is transmitted to air in such flow path.

2. The system of claim 1, further comprising compressor motor means for driving said compressor, said compressor motor means being positioned on a side of said thermal insulation means in exposure to air from within such area, whereby heat developed by said compressor motor means is transmitted to air in such flow path.

3. The system of claim 1, further comprising manually operated electric resistance heater means in such flow path for supplementally heating air flowing therein.

4. The system of claim 1, further comprising supplemental heater means for melting ice from said evaporation coil.

5. The system of claim 4, said supplemental heater means comprising an electric radiant heat panel.

6. The system of claim 5, said supplemental heater means further comprising a reflector, said panel and said reflector being positioned relative to said condensation coil for concentrating heat thereon.

7. A system for heating the air of an area of a building, comprising a refrigeration heating unit, including an evaporation coil, a condensation coil, an expansion valve, a compressor, and a working fluid, thermal insulation means for separating at least a substantial portion of said evaporation coil from said condensation coil, the former and latter being positioned in air flow communication, respectively, with air exteriorly and with air inside of such building as separated by said thermal insulation means, blower means for blowing air from within such area along a flow path across said condensation coil to be heated thereby and into such area for heating the same, and motor means for driving at least one of said compressor and blower means, said motor means being positioned interiorly of said thermal insulation means whereby heat developed by said motor means is transmitted to air in such flow path.

8. A system for conditioning the air of a selected area of a building having at least one exterior wall, comprising heating and cooling means for respectively heating and cooling such area, said heating and cooling means comprising a separate refrigeration heating unit and refrigeration cooling unit positioned in such exterior wall of such area, and each being of a size corresponding, respectively, to the approximate heating and cooling requirements of such area, said refrigeration heating unit of said heating means including an evaporation coil, a condensation coil, and expansion valve, a compressor, and a working fluid, said heating means further comprising thermal insulation means for separating at least a substantial portion of said evaporation coil from said condensation coil, the former and latter being positioned in air flow communication, respectively, with air exteriorly and with air inside of such building as separated by said thermal insulation means, blower means for blowing air from within such area along a flow path across said condensation coil to be heated thereby and into such area for heating the same, and motor means for driving said blower means, said motor means being positioned on a side of said thermal insulation means in exposure to air from within such area, whereby heat developed by said motor means is transmitted to air in such flow path.

9. A system for conditioning the air of a selected area of a building having at least one exterior wall, comprising heating and cooling means for respectively heating and cooling such area, said heating and cooling means respectively comprising a separate refrigeration heating unit and a separate refrigeration cooling unit, each positioned in such exterior wall of such area, and each being of a size corresponding, respectively, to the approximate heating and cooling requirements of such area, said separate refrigeration heating and cooling units respectively including means only for heating and cooling such area and not vice versa, said refrigeration heating unit of said heating means including an evaporation coil, a condensation coil, an expansion valve, a compressor, and a working fluid, said heating means further comprising thermal insulation means for separating at least a substantial portion of said evaporation coil from said condensation coil, the former and latter being positioned in air flow communication, respectively, with air exteriorly and with air inside of such building as separated by said thermal insulation means, blower means for blowing air from within such area along a flow path across said condensation coil to be heated thereby and into such area for heating the same, and motor means for driving at least one of said compressor and blower means, said motor means being positioned interiorly of said thermal insulation means whereby heat developed by said motor means is transmitted to air in such flow path.

* * * * *